Aug. 24, 1965    J. A. YOUNG    3,202,734
FOAMED PLASTIC MOLDING METHOD AND APPARATUS
Filed April 7, 1961    4 Sheets-Sheet 1
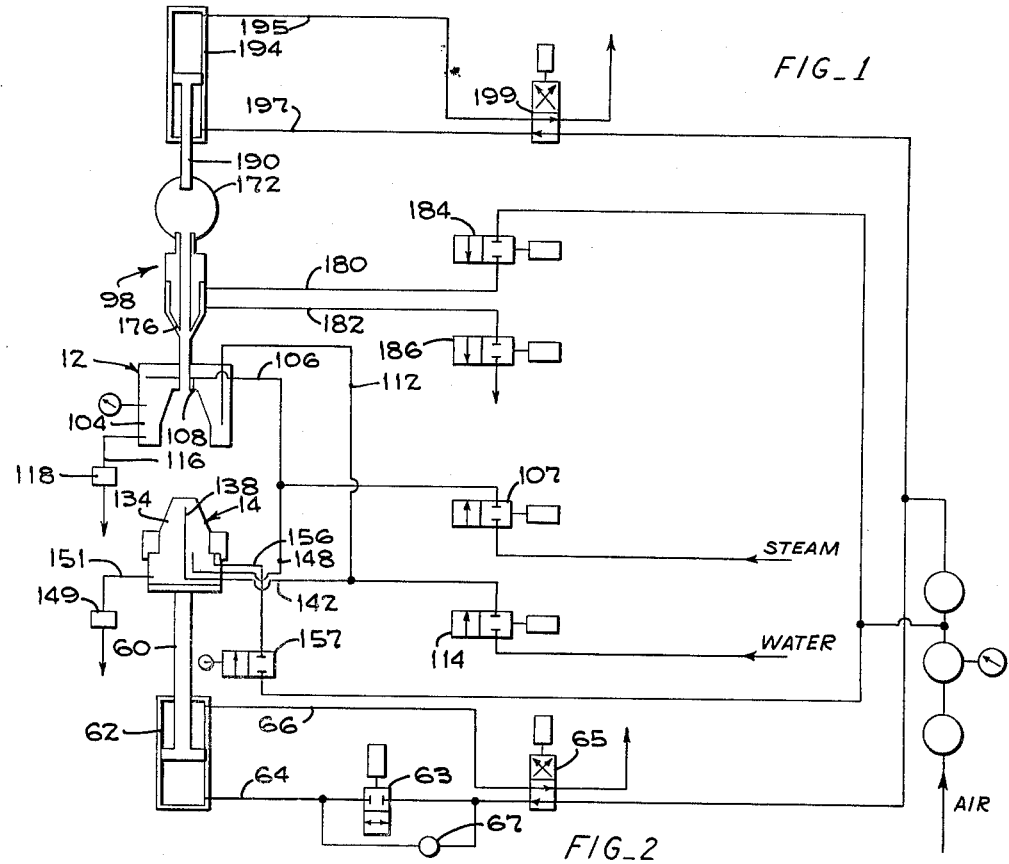
FIG_1
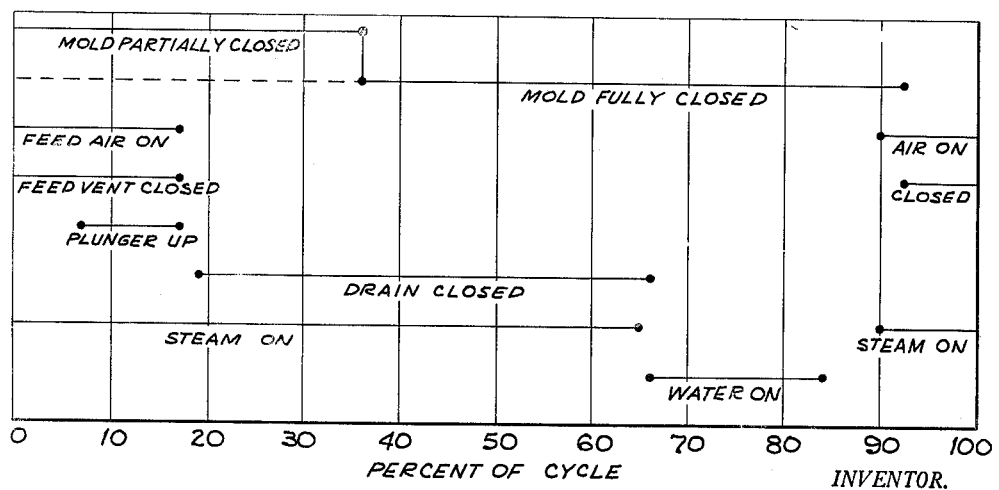
FIG_2
INVENTOR.
JAMES A. YOUNG
BY
Paul B. Fike
PATENT AGENT

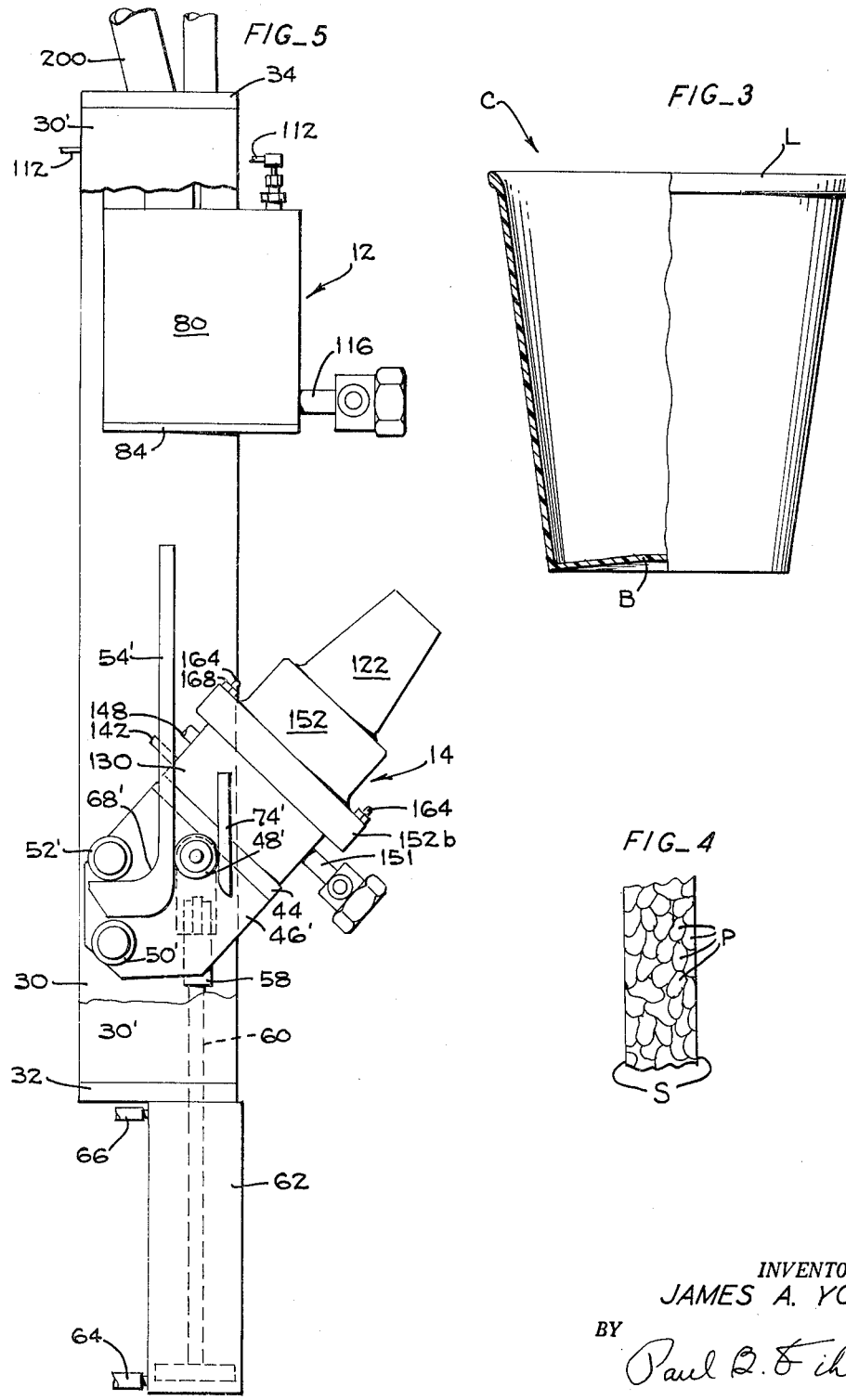

Aug. 24, 1965         J. A. YOUNG         3,202,734
FOAMED PLASTIC MOLDING METHOD AND APPARATUS
Filed April 7, 1961                        4 Sheets-Sheet 3
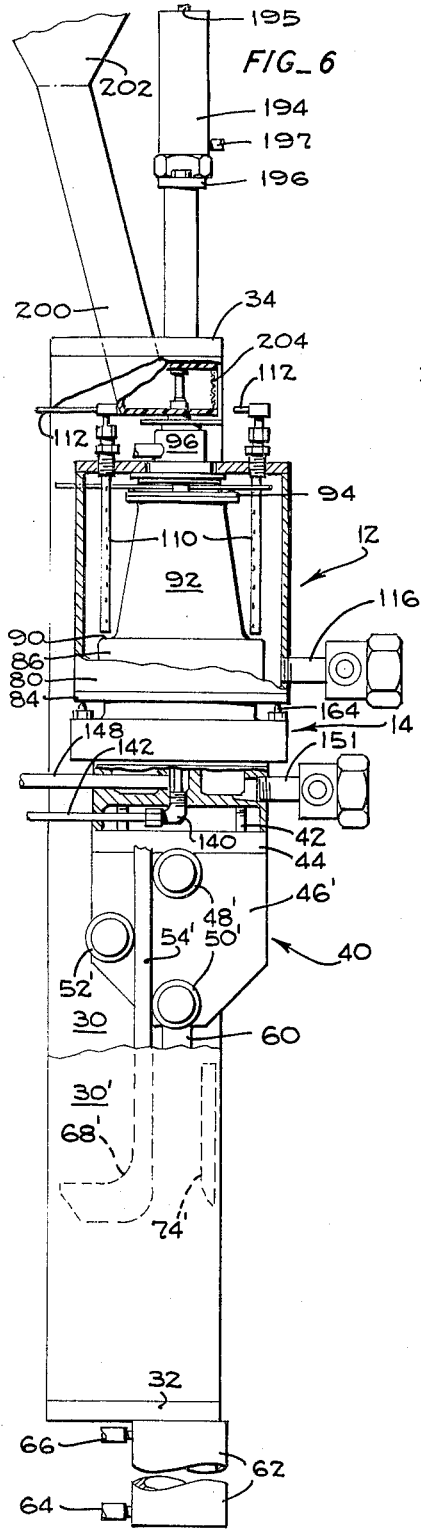
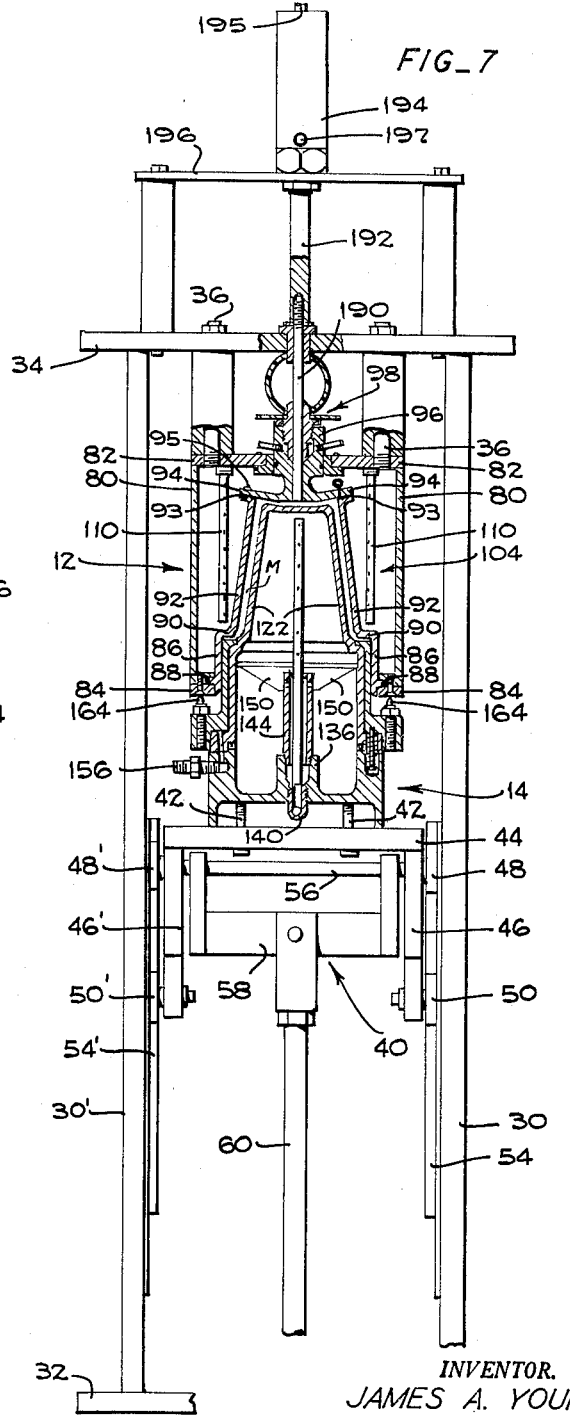
INVENTOR.
JAMES A. YOUNG
BY
Paul B. Fike
PATENT AGENT

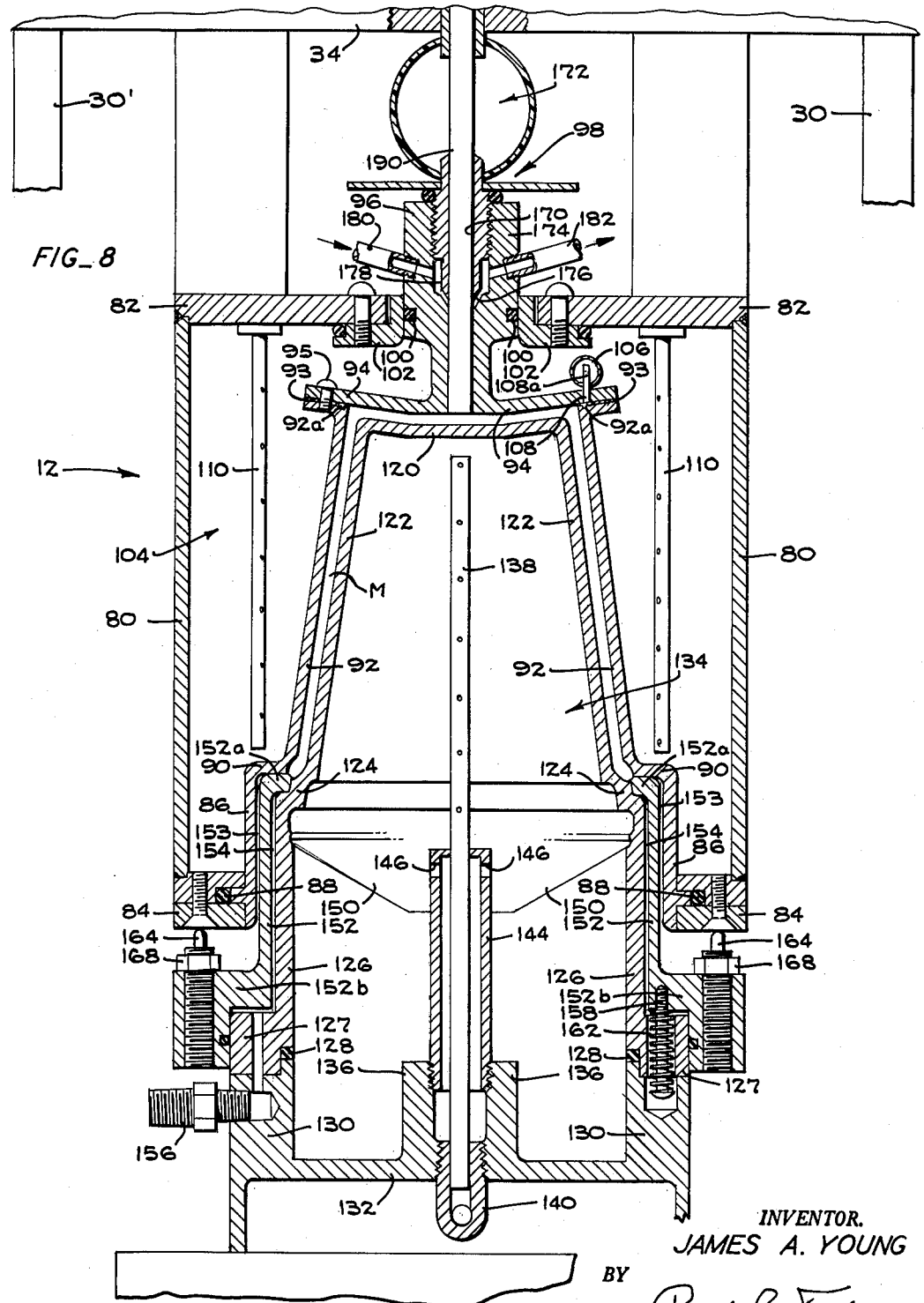

United States Patent Office 3,202,734
Patented Aug. 24, 1965

3,202,734
FOAMED PLASTIC MOLDING METHOD AND APPARATUS
James A. Young, San Jose, Calif., assignor to Sani-Gard Plastics Company, Santa Clara, Calif., a corporation of California
Filed Aug. 7, 1961, Ser. No. 129,688
3 Claims. (Cl. 264—53)

The present invention relates to plastic molding methods and apparatus, and more particularly, to a molding method and apparatus utilizing expansible plastic materials.

The expansible plastic materials to which the present invention pertains are commercially available in the form of small beads composed of a thermoplastic material, such as polystyrene, charged with a foaming agent, such as pentane, wherefore upon suitable application of heat, considerable expansion of the material is experienced. When the beads are subjected to both heat and pressure as in a mold, expansion and uniting of the beads occurs so that a completed article is fashioned having desirable characteristics of low weight and good insulation, such characteristics being extremely significant in the production of various articles. It may be mentioned that the small beads, as received from the manufacturer, are conventionally pre-expanded a certain amount before admission to the mold.

In such molding operations, however, some difficulties have been encountered, particularly where a high production rate is necessitated. Large voids in the finished products have occurred, intermittent clogging of the bead inlet has been experienced, and of perhaps greatest significance, the time required for a single molding cycle has been inordinately excessive.

It is, accordingly, a general object of the present invention to provide an improved method and apparatus utilizing expansible plastic materials for molding articles, such as drinking cups, where a high rate of production is a prime requisite.

It is a feature of the invention to provide a molding method wherein the expansible plastic material is heated both directly and through contact with the walls of the mold whereby rapid expansion of the beads can occur and ultimately result in an extremely short molding cycle.

More particularly, it is a feature to provide heating by the application of steam to both the exterior and interior of the mold, the latter injection taken place automatically timed to enhance the speed and effectiveness of the entire molding process.

Additionally, it is a feature of the invention to provide a molding method wherein the heat is evenly distributed to all portions of the plastic material whereby not only is the time for the molding cycle reduced, but the finished article is free from voids or otherwise improperly molded segments.

It is a further feature of the invention to provide a molding method and apparatus wherein rapid filling of the mold can be accompnished without the concomitant production of voids or other deleterious effects.

More particularly, it is a feature of the invention to provide a molding method and apparatus wherein such filling is accomplished through venturi action and control of the venturi orifice is provided to accommodate variances in size of the plastic beads or of the mold cavity itself.

A related feature of the invention is to provide a molding method and apparatus wherein the filling is accomplished in a manner to automatically insure the delivery of the precisely desired amount of material to the molding cavity, no more and no less.

It is another feature of the invention to provide a molding method and apparatus utilizing small plastic beads wherein the bead supply is subjected to aeration and agitation so that no bridging or other clogging of the material feed is experienced.

Yet another feature of the invention relates to the provision of a molding method and apparatus wherein fluid pressure is utilized to strip the finished product from the mold parts to thus insure rapid, non-destructive, separation and ultimately effect further reduction in the time required for a molding cycle.

Another feature, related to the reduction of time of the molding cycle, is the provision of molding apparatus wherein the separable portions of a mold can be quickly separated for immediate ejection of the finished article and then be immediately returned to their closed positions preparatory to the start of another molding cycle.

These as well as other objects and features of the invention will become more apparent from a perusal of the following description of the method embodying the invention and the subsequent description of apparatus that can be utilized for advantageously carrying out such method.

Generally, the method of the present invention includes, as an initial step, the induced feeding of the expansible plastic beads into the mold by the establishment of a rapid flow of air between the bead supply and the mold interior, thus to insure rapidity of the filling operation. Thereafter, heat is applied both directly to the plastic beads within the mold and also indirectly by conduction through the walls of the mold to assure maximum rate of heating and expansion of the material into the finished molded article. Preferably, to avoid any time lag in the heating process, it is initiated even prior to the filling of the mold cavity. Finally, the mold is opened and the finished article ejected, preferably by the application of fluid pressure between the walls of the mold and the adjoining surfaces of the molded article.

The method and the apparatus for carrying out such method can be explained in greater detail in the particular application to the molding of plastic drinking cups and with reference to the accompanying drawings wherein:

FIG. 1 is a schematic diagram of apparatus for the molding of plastic cups,

FIG. 2 is a chart illustrating the time sequence of the steps of the method and more particularly the cyclical sequence of the functions of the apparatus illustrated schematically in FIG. 1, FIG. 3 is a drinking cup formed from expansible plastic beads in accordance with the method of the present invention, portions of the cup being broken away to illustrate structural details thereof, FIG. 4 is an enlarged fragmentary section of the drinking cup to illustrate more clearly its interior structure, FIG. 5 is a side elevational view of a molding apparataus capable of carrying out the steps of the method of the present invention, the mold being illustrated in opened position, FIG. 6 is a side elevational view, generally similar to FIG. 5 but with portions broken away to illustrate additional details of construction, and with the mold in closed position, FIG. 7 is a front elevational view of the apparatus, but with the central mold portion thereof partially closed and shown in central section to illustrate yet further details of its structure, and FIG. 8 is an enlarged sectional view of the mold portion of the structure generally similar to FIG. 7, but with the mold in fully closed position.

In order to form a plastic drinking cup in accordance with the steps of the present invention, a cup-shaped mold cavity is provided. Preferably, as diagrammatically illustrated in FIG. 1 and as will be described in structural detail hereinafter, the cup-shaped mold cavity is formed between an exterior cavity member 12 which opens downwardly and an interior core member 14 which can be moved upwardly into cavity forming position within the cavity member. More specifically, the core member 14 is capable of assuming three positons, the mold open position, illustrated in FIG. 1 whereat ejection of the finished cup can take place, a partially-closed or vented position wherein the core member is inserted into the cavity member but a small vent opening or "crack" is left between the lower edges of the cavity forming members whereby the cavity is vented during the filling steps of the method, and a third fully-closed position wherein the molding of the plastic beads within the filled cavity can take place to produce the finished drinking cup. The steps of the entire molding cycle are carried out in timed sequence, as indicated in FIG. 2, by the use of suitable automatic controls (not shown).

From the open or cup ejection position as illustrated, the core member 14 is moved into its vented or "cracked" relationship with the cavity member 12 to enable initiation of the method. Generally, the first step in the method is the filling step which entails establishing communication between the interior of the mold cavity and a supply chamber for the pre-expanded beads, and then providing a rapid flow of air between the cavity and the supply chamber so that the beads will be delivered rapidly from the latter into the former. More particularly, communication is established between the supply chamber and the cavity by withdrawing a plunger from a passageway which links the two and then blowing air through a venturi orifice located in such passageway, wherefore beads within the supply chamber will be drawn therefrom, entrained with the air, and conveyed into the cup-shaped mold cavity. The "crack" or vent opening in the cavity is sufficiently small so that beads cannot pass therethrough but the conveying air can be continuously exhausted through such vent. To assure that beads can pass freely from the supply chamber, air flow is induced therethrough to aerate and agitate the beads therein. The described venturi feed action is such that when the mold cavity is filled, a turbulence is created in the passageway communicating the mold cavity and the supply chamber so that the filling operation automatically ceases and furthermore the plastic beads remaining in the passageway are redirected into the supply chamber. At this time communication between the supply chamber and the mold cavity can be interrupted by reinsertion of the mentioned plunger into the communicating passageway.

The described specific steps of the filling operation are such that a very rapid filling of the mold cavity is enabled. Since the cavity itself is vented, a rapid flow of air can be brought from the venturi into the communicating passageway and thence through the mold cavity to the vent at the remote end thereof. This high rate of air flow, in turn, delivers beads at high velocity into the cavity to fill the same quickly and furthermore completely wherefore voids in the final molded article are effectively precluded. It will be observed by reference to the cycle sequence cnart that the plunger is up only for a period representing approximately 10% of the entire molding cycle. Additionally, it will be observed that the connection to the source of the feeding air is established prior to the time that communication is established between the supply chamber and the mold cavity through withdrawal of the plunger so that when such withdrawal occurs, the feed of the beads is immediately instigated. As will be described in detail hereinafter, the air source which provides for feeding of the beads also functions in a subsequent portion of the cycle to assist in ejection of the completed cup from the mold cavity.

Both during and subsequent to the described cavity filling steps, heat is applied preferably by use of high pressure steam to the walls of the cavity-forming members 12, 14. Furthermore, at an appropriate time in the molding cycle, steam is also admitted to the cavity interior to heat directly the beads therewithin. More specifically, the high pressure steam is applied through a suitable inlet tube to chambers that are formed exterior to the walls of the mentioned cavity members 12, 14 to heat the same. Additionally, the cavity interior is connected to the high pressure steam source by means of a probe inserted at a right angle through the steam inlet tube, such probe having a restricted passage facing downstream to the steam flow, thus to function as a venturi which prevents admission of steam to the cavity interior until the cavity members 12, 14 are preheated and back pressure is created in the chambers, at which time a metered flow of steam is admitted to the interior of the mold cavity to come into direct contact with the plastic beads. Since the steam is applied both directly into contact with the plastic beads and also heats the walls of the cavity-forming members 12, 14, maximum heat transfer to the beads is accomplished to effect a rapid expansion and uniting of the same into the molded cup. Additionally, since the steam supply is connected to the mold at approximately the same time that the filling of the cavity is instigated (see FIG. 2), the time lag experienced in the normal heat transfer is, in effect, substantially eliminated. Furthermore, the venting of the cavity is continued for a certain period of time after the cavity is entirely filled with the plastic beads; wherefore any air remaining in the interstices between the beads will be purged by the steam admitted to the cavity, and after a very short period of time, only a high temperature fluid will be in contact with the plastic beads. At this time, and only at this time, is the mold core member brought to its fully closed position where it remains during the remainder of the period required for expansion and uniting of the beads under the applied heat.

After sufficient heat transfer has taken place to expand and unite the plastic beads, the supply of steam is disconnected and coolant in the form of water is sprayed against the walls of the mold forming members, a drain exhaust being provided so that a continual flow of fresh cold water against the mold forming members is enabled. The described cooling action is sufficiently efficient so that less than 20% of the entire molding cycle is consumed in the cooling activity, as can be seen by reference to FIG. 2.

Upon completion of the cooling, the cup is completed, and the mold cavity may be opened to enable ejection thereof. However, to facilitate such ejection, the mentioned supply of feed air is connected just prior to opening of the mold so that a small amount of air can pass into the upper portion of the cavity and force its way between the exterior surfaces of the finished cup and interior of the cavity member 12. Thus, when the mold is opened, a film of air exists between these two surfaces to preclude any adherence of the finished cup to the exterior cavity wall. Furthermore, the air source is connected, as the opening of the mold commences, to the space between the cup interior and the exterior surface of the core member 14 to similarly preclude adherence therebetween. As a consequence, it will be apparent that the supply of air not only functions to feed the plastic beads into the mold, but also assists in removal of the finished cup from the mold.

The ejection of the finished cup from the mold is thus achieved quickly, and as can be seen by reference to the cycle sequence chart of FIG. 2, the mold is actually in closed position for more than 90% of the entire molding cycle thus indicating maximum efficiency and ultimately an absolute minimum of time for the carrying out of one molding cycle.

When the described method is utilized for the formation of a drinking cup C from plastic beads, such cup C will have the appearance illustrated in FIGS. 3 and 4. As shown in FIG. 3, the cup C preferably takes a frusto-conical form with an enlarged lip L and a slightly depressed or indented base B which permits stacking. In enlarged cross section, as illustrated in FIG. 4, the cup C is composed of united plastic beads with smooth exterior surfaces S, but with its interior interlaced with small pockets P formed by the expanded foaming agent. A normal six ounce cup of this type can be molded with a total cycle period that is less than twenty seconds, wherefore a very high production rate is assured.

In order to form a plastic drinking cup C, such as illustrated in FIGS. 3 and 4, the described method steps can be carried out with the apparatus illustrated in detail in FIGS. 5, 6, 7 and 8. The illustrated apparatus includes a frame composed of flat side plates 30, 30' which rise vertically and in parallel relationship from a supporting base plate 32 and are rigidly connected at their upper ends by a bridging top plate 34. The cavity member 12 is suspended from such top plate 34 by suitable bolts 36 so that its frusto-conical interior opens downwardly between the side plates 30, 30' for reception of the core member 14, as previously mentioned.

So that the core member 14 can be moved upwardly into the interior of the cavity member 12, such core member is supported on a carriage 40 arranged for vertical movement between the described side plates 30, 30'. More particularly, the core member 14 is secured by bolts 42 to a transverse mounting plate 44 forming part of the carriage 40. Dependent ears 46, 46' are connected rigidly to the core member mounting plate 44 adjacent its opposite extremities and each ear rotatably supports on its outer surface three wheels or rollers 48, 50, 52 at positions such that the rollers engage opposite surfaces of a track 54 or 54' rigidly secured to the respective side plate 30 or 30' in substantially a vertical disposition. As best illustrated in FIG. 6, the uppermost and lowermost rollers 48, 50 are supported in substantially vertical alignment so as to engage the forward surface of the track 54 while the vertically intermediate roller 52 is laterally positioned on the mounting ear 46 so as to engage the rear surface of such track. Consequently, when the carriage 40 is moved upwardly to bring the core member 14 into the cavity member 12, vertical alignment of the core member is assured by engagement of the rollers 48, 50, 52 with the two surfaces of the track 54, as illustrated in FIG. 6.

The shaft 56 carrying the uppermost rollers 48, 48' of the carriage 40 also is pivotally connected to a bracket 58 which joins the shaft operatively to a vertically-disposed piston rod 60 that projects upwardly from a pneumatic cylinder 62 suitably secured beneath the described base plate 32 in appropriate vertically aligned relationship with the carriage 40. Conduits 64, 66 having a four-way solenoid valve 65 (see FIG. 1) therein are connected in conventional fashion to the upper and lower ends of the cylinder 62 so that when high pressure air is admitted to the lower conduit 64, the carriage 40 and the core member 14 carried thereby will be moved upwardly toward mold closing position while, on the other hand, when air is admitted to the upper conduit 66, the carriage 40 will be moved downwardly to withdraw the core member 14 from the cavity member 12 and thus permit ejection of a molded cup.

An additional solenoid valve 63 is placed in the conduit 64 and is by-passed by a conduit with a pressure regulator 67 to enable application of air at lower pressure to the cylinder 62 and thus effect partial closing of the mold M.

Preferably, means are provided to effect tilting of the carriage 40 and the core member 14 supported thereby adjacent the lower end of the stroke of the piston rod 60 to facilitate the ejection and removal of the completed cup. Such means include a curved cam 68 formed integrally at the lower end of the described vertically disposed track 54 and projecting laterally therefrom. When the carriage 40 is moved downwardly under appropriate actuation of the pneumatic cylinder 62, and the intermediate roller 52 engages the curved upper surface of the cam 68, further vertical motion of such roller is prohibited and any further movement thereof is restricted to a lateral direction to the left, as viewed in FIG. 5. Because of the conitnued pull on the uppermost roller shaft 56, such lateral motion of the intermediate roller 52 does take place accompanied by lateral arcuate motion of the lowermost roller 50 about the lower surface of the cam 68. Thus the continued pull on the carriage 40 after the intermediate roller 52 has engaged the cam 68 effects a tilting of the entire carriage whereupon the core member 14 assumes a tilted disposition, as illustrated best in FIG. 5. While the piston rod 60 is a rigid structure, it is preferred to provide a guide rail or fence 74 adjacent the uppermost roller 48 in that interval where the pivoting action occurs, thus to confine such roller and preclude the possibility of the application of bending forces to the piston rod 60 during the tilting operation. Obviously, when upward force is applied to the piston rod 60 and thus to the shaft 56 carrying the uppermost roller 48 of the carriage 40, the initial action of the carriage 40 is to resume its vertical disposition so as to bring the core member 14 into alignment with the rigidly-supported cavity member 12 thereabove, and thereafter the carriage 40 and the core member 14 move together in a substantially vertical path that is aligned with the cavity member 12 to assure proper coupling of the mold parts.

As best shown in FIG. 8, the mentioned cavity member 12 includes an outer generally-cylindrical housing 80 welded at its upper edge to the periphery of a top annular plate 82 that is rigidly suspended by the previously mentioned bolts 36 from the top plate 34 of the frame to provide the stationary mounting of the cavity member, and is similarly welded to an inwardly directed annular flange 84 at its lowermost end. The lowermost extremity of an inner tubular member 86 is secured in sealing relationship to the inner edge of this flange 84 by an O-ring seal indicated at 88. Such inner tubular member 86 first rises substantially vertically and thereafter bends inwardly to form a shoulder 90 and thence extends upwardly and inwardly to provide the frusto-conical wall 92 defining the exterior of the cup-shaped mold cavity, indicated generally at M in FIGS. 7 and 8. An annular groove 92a, seen best in FIG. 8, is formed in the upper edge of the wall 92 and a gasket 93 of thin metal foil surrounds such groove and is engaged by an annular cap 94 that is secured to the upper end of the frusto-conical wall 92 by suitable screws 95. Tightening of these screws 95 provides sealing force on the gasket 93 but leaves a restricted passage between the groove 92a and the cavity M for a purpose to be explained hereinafter. As shown, the annular cap 94 is depressed centrally to provide the dished bottom of a cup and preferably both the frusto-conical wall 92 and the cap 94 are formed of relatively thin metal having high heat conductivity to enable maximum transfer of heat therethrough into the plastic material in the mold cavity M.

Centrally of the annular cap 94, an integral generally cylindrical body 96 rises upwardly therefrom to provide the housing of a blow-filling gun 98 which will be described in detail hereinafter. This blow-filling gun body 96 projects through the annular top plate 82 of the cavity member housing and is annularly indented to support an O-ring 100 in sealing engagement with a flange 102 mounted on the interior edge of the annular housing plate 82. In this manner, a seal is established, but slight relative movement under differential heat expansion of the blow-filling gun body 96 and the surrounding housing of the cavity member 12 is enabled.

Between the walls of the outer housing 80 and the actual mold wall 92 of the cavity member 12, an annular chamber 104 is formed to permit the introduction of hot or cold fluids thereinto whereby heat transfer through the mold wall into the plastic material can be readily and simply achieved. More particularly, a conduit 106 is connected through the outer cylindrical housing 80 to supply stream to the chamber 104, the steam flow being controlled by a conventional solenoid valve 107, as diagrammatically shown in FIG. 1.

The conduit 106 extends over the annular cap 94 and its interior is placed in communication with the described groove 92a by the mentioned probe 108 that is in the form of a short tube that opens downwardly into the groove and is provided with a small lateral opening 108a within the conduit 106, such opening being directed downstream of the direction of steam flow through the conduit 106. Consequently, steam will be introduced through the probe 108 and groove 92a into the mold M only after a predetermined build-up of steam pressure has occured in the chamber 104, such arrangement precluding the possibility of water entering the mold M from the chamber 104.

For admission of coolant into the chamber 104, apertured tubes 110 are suspended in sealed relation from the annular plate 82 and their interiors are connected through suitable conduits 112 to a supply of cold water (not shown). Thus cold water can pass, when a solenoid valve 114 is opened, through the tubes and the multiplicity of apertures therein so as to impinge in a fine spray against the mold wall 92 of the cavity member 12. With particular reference to FIG. 6, a drain conduit 116 is connected to the chmaber 104 adjacent its lowermost end to permit the exhausting of either steam or water from the chamber at the appropriate times during the molding cycle and a suitable solenoid valve indicated at 118 in FIG. 1 is actuated to effect the required opening or closing of such drain conduit.

The mentioned core member 14, shown most clearly in FIG. 8, is hollow, being formed of a relatively thin wall of highly heat conductive metal including an uppermost circular portion 120 substantially horizontally disposed in spaced relation to the cap 94 of the cavity member 12 when the core member 14 is fully inserted thereinto whereby the desired thickness of the base portion of a cup can be obtained. From such uppermost circular portion 120, the wall of the core member tapers downwardly to form a frusto-conical portion 122, again in spaced relation to the encompassing frusto-conical wall 92 of the cavity member 12 when the core member is fully inserted so that the tapered side of the cup can be formed therebetween with desired thickness. At the lower extremity of the frusto-conical portion 122 of the core wall, a step or shoulder 124 is formed and the wall thence continues vertically downwardly to form a lower cylindrical portion 126 whose lower extremity is an integral flange 127 supported in sealing relationship, as indicated at 128, on the upwardly projecting cylindrical flange 130 on the core member base 132 that is secured by the previously mentioned bolts 42 to the movable carriage 40. Such core member base 132 includes as integral annular portion arranged to provide the bottom of the chamber 134 formed within the hollow core member 14 and a central boss 136 through whose central bore steam and water can be admitted to the interior of such chamber. More particularly, a tube 138 perforated at its upper end within the frusto-conical portion 122 of the core member 14 is supported at its lower extremity in an elbow 140 threaded into the lower portion of the boss 136 and in communication with a conduit 142 that passes laterally through a suitable opening in the base member 132 and thence joins the water conduits 112 for ultimate connection to the described supply of cold water (see FIG. 1). The upper portion of the boss 136 is counterbored and threaded to receive a metal tube 144 that encompasses the lower end of the water tube 138 and provides an annular passageway extending between lateral openings 146 in the upper end of the tube 144 and a second lateral opening in the base member 132 which houses a conduit 148 connected to the described steam conduit 106 and the mentioned supply of high pressure steam. The lateral openings 146 in the steam tube 144 are beneath the perforated portion of encompassed water tube 138 and preferably inclined baffles 150 are formed within the chamber 136 adjacent such steam openings so as to redirect the lateral flow of steam upwardly into contact with the frusto-conical and circular portions 122, 120 of the core member 14. A drain conduit 151 is connected to the lower end of the core chamber 134 and is controlled by suitable valve 149 as shown in FIG. 1.

In order to provide the partially-closed mold position whereat the mold-cavity is "cracked" or vented, a generally cylindrical member 152 having flats machined on its outer surface to form exterior passages 153 is arranged to surround the lower cylindrical portion 126 of the core wall and form interior passages 154 therebetween. Such cylindrical member 152 has a small inwardly directed flange 152a at its upper end which is adapted to sealingly engage the step or shoulder 124 of the core member wall and an outwardly directed flange 152b at its lower end which is resiliently secured to the core wall by machine screws 158 threaded into the flange 152b so as to extend downwardly through small circumferentially-spaced bores in the adjoining flange 127 at the lower end of the core wall so that their heads lie within aligned and slightly larger bores in the cylindrical flange 130 of the base member 132. A spring 162 is compressed between the head of each machine screw 158 and the core wall flange 127 so that while such wall and the cylindrical encompassing member 152 are generally held together, the described resilient connection will permit slight upward movement of the cylindrical member 152 to allow compressed air to leak between the finished cup and the core member at time of ejection of the finished cup from the core member, as will be described hereinafter. Such air is admitted through a lateral conduit 156 under control of a valve 157 (see FIG. 1). Exterior of the connection between the cylindrical member 152 and the encompassed portion of the core wall, a series of circumferentially-spaced pins 164 are mounted in the flange 152b and are urged upwardly with predetermined force by suitable springs (not shown) into engagement with the annular flange 84 at the lowermost extremity of the cavity member housing 80. A nut 168 enables adjustment of the extended position of each pin 164 and such adjustment is made so that admission of low pressure air into the pneumatic cylinder 62 will move the core member 14 upwardly to partially-closed position whereat the pins 164 come into engagement with the annular flange 84 of the cavity member 12 and whereat a slight space remains between the flange 154 at the top of the cylindrical member 152 and the shoulder 90 on the encompassing cavity member 12. This space is in communication not only with the interior of the mold cavity, but also through passages 153 between the lower tubular portion 86 of the cavity member 12 and the flats on the cylindrical member 152 and thus, ultimately, with the atmosphere. This partially closed or "cracked" position of the mold, as illustrated in FIGS. 6 and 7, is that necessary for venting of the mold during the filling operation, as will become apparent hereinafter. If air of higher pressure is admitted to the pneumatic cylinder 62, the resistance of the pin springs 166 will be overcome and the core member will be moved upwardly an additional increment to its fully closed position, as illustrated in FIG. 8.

The described "crack" or vent in the mold when the mold members 12, 14 are in their partially-closed positions, as illustrated in FIG. 8, being adjacent the rim of the cup formed in such mold, is therefore at the remote extremity of the mold cavity M from the previously mentioned blow-filling gun 98 which, as will be remembered, is positioned centrally at the base portion of a cup to be formed, or in other words, at the upper central portion of the mold cavity. Such blow-filling gun 98 includes the previously mentioned body or housing 96 formed integrally with the cap 94 of the cavity member 12 and has a central substantially vertical bore 170 passing therethrough with its lower end terminating in the upper portion of the mold cavity M and its upper end terminating in a supply chamber 172 for the plastic beads. Adjacent its upper end, the body 96 is counterbored and threaded for reception of an annular member 174 whose interior forms a continuation of the bore 170 in the lower end of the body 96 and whose extremity forms in cooperation with the body 96 an annular venturi 176 which terminates in such central bore substantially midway between the supply chamber 172 and the mold cavity M. The other terminus of the venturi 176 joins an annular chamber 178 having communication with an air inlet conduit 180 and a diametrically opposed air exhaust conduit 182. As shown in FIG. 1, each of these air conduits 180, 182 is provided with a suitable solenoid valve 184, 186 so as to be opened or closed in accordance with the appropriate timed sequence of the molding cycle.

When air is admitted through the air inlet conduit 180 and the exhaust conduit 182 is closed, it passes through the venturi 176 and into the central bore 170 in the body 96 of the blow filling gun 98 and thence downwardly into the mold cavity M. As is known, such entry of air through a venturi into a passageway creates a suction to the rear of the venturi opening, or, in this case, within the bore portion communicating with the bead supply chamber 172. Thus air not only enters the bore 160 and passes downwardly through the lower portion thereof from the venturi orifice 176 itself, but additional fluent particles, in this case, the beads, are drawn from the supply chamber 172 and are passed, entrained with the air, downwardly into the mold cavity M. If such mold cavity M is vented or "cracked," the air can flow with the beads through the entire cavity down to the remote edge thereof where the air can continue to flow and exhaust itself exteriorly of the mold cavity, but the beads are retained therewithin, such crack or vent opening being of insufficient size to pass such beads. The filling of the cavity M with the beads continues in this manner and it is notable that since the air passes entirely through the cavity, there is no back pressure or turbulence created and thus voids in the cavity are effectively precluded. After the cavity M has been entirely filled with beads, the continued flow of air and beads creates a turbulence in the lower portion of the bore 170 of the blow-filling gun 98 and the air and the beads are returned upwardly through such bore to the supply chamber 172, thus, in effect, purging the bore of beads so that subsequently the bore can be closed during the application of heat to the beads within the mold cavity M.

In order to close the bore 170, a plunger 190 is supported from the lower end of a piston rod 192 projecting downwardly from a pneumatic cylinder 194 of conventional type which is supported on a bracket 196 mounted above the top plate 34 of the mold frame and is actuated by air supplied through conduits 195, 197 controlled by a four-way solenoid valve 199 (see FIG. 1). The mounting of the plunger 190 is such that it is aligned with the bore 170 and when moved downwardly under suitable actuation by the cylinder 194, it passes downwardly through the bore 170 of the blow-filling gun 98 to stop with its lower extremity in the plane of the upper cap 94 of the cavity member 12.

The mentioned supply chamber 172 for the beads is relatively small having a generally cylindrical shape with a closed chute 200 joined to one end thereof so that beads are constantly fed from a hopper 202 into such supply chamber by the mere action of gravity. At its other end, a screen 204 is positioned to retain the beads, but to permit air flow through the chamber 172 to both aerate and agitate the beads therein.

The structure of the apparatus having been described primarily with reference to FIGS. 5, 6, 7 and 8, its operation during a molding cycle can now be described with additional reference to FIGS. 1 and 2. It will be assumed that the supply chamber 172 and the associated hopper 202 are filled with beads, that the timing controls are set, that the steam, water, and air supplies are appropriately connected and finally, that a molding cycle has just been completed so that the core member 14 has been withdrawn to its open position, as illustrated in FIG. 1 and FIG. 5.

By reference to the cycle sequence chart of FIG. 2, it will be observed at the end of the cycle when the mold is open, the feed air has already been connected to the blow-filling gun 98 and the feed vent closed. The drains for both the core member 14 and the cavity member 12 are opened, the water supply is closed, but the steam supply is connected to both the cavity member and core member chambers 104, 136. As a consequence, heating of the core member and cavity member walls has already been instigated, but steam pressure therewithin is not allowed to build up because the drains are open and no steam traverses the probe 108 into the mold M.

Initially, to close the mold, the four-way solenoid valve 65 in the air conduit 64 is energized to admit air through the regulator 67 to the lower end of the pneumatic cylinder 62, it being understood that the valve 63 is closed by its solenoid. The admitted air pushes the piston rod 60 upwardly from the position illustrated in FIG. 5 whereupon the carriage 40 first is caused to pivot from its tilted position and thereafter is moved directly vertically until the core member 14 enters the cavity member 12 and ultimately the restraining pins 164 engaged the flange 84 at the lower end of the cavity housing. Thus the mold cavity M is in its partially closed or "cracked" position wherein it is vented at its lower annular edge, as illustrated in FIG. 7.

Shortly after the mold parts have reached the partially closed position, the solenoid controlling the air valve 199 associated with the filling plunger 190 is energized so that such plunger is quickly withdrawn from the blow-filling gun 98; and since air pressure already exists in the air inlet conduit 180 connected to such blow gun and the air vent conduit 182 is closed, air immediately begins to flow through the venturi 176 so as to draw the plastic beads from the supply chamber 172, entrain the same and commence the filling of the partially-closed mold cavity M. Since steam, as previously mentioned, has already been admitted into the chambers 104, 134 to heat the walls of the cavity member 12 and core member 14, the process of bead expansion is instigated almost immediately upon entry of the beads into the mold cavity. The filling occurs rapidly and without interruption since the continuous flow of air into the supply chamber 172 agitates the beads and thus precludes bridging or other stoppage of the feed operation. Immediately after the mold cavity M is completely filled, the feed air is shut off, the plunger 190 is reinserted, and the air vent conduit 182 is opened. The drain conduits to the chambers associated with both the core member 14 and cavity member 12 are then closed so that the continued supply of steam thereto builds up pressure within such chambers, the attained pressures normally reaching 20 or 30 pounds per square inch. When the pressure begins to build up within the core member 14, steam is forced to pass through the restricted passage in the probe 108 to the interior of the cavity member 14 and come into direct contact with the beads. Obviously, any air remaining within the mold cavity M will be vented through the vent opening at its lower edge and within a very short period, the plastic beads will only be in contact with the hot steam so that the expansion and uniting will occur rapidly.

When the venting of the feed air has been completed, the bypass valve 63 in the air conduit 64 to the carriage-actuating cylinder 62 is opened so that high pressure air is admitted and overcomes the restraining action of the spring-urged pins 164 so that the core member 14 moves further upwardly to its fully-closed position, as illustrated in FIG. 8. The expansion and uniting of the beads, which has already been started, is now completed with utmost rapidity and effectiveness through conduction of heat through the walls of both the core member 14 and cavity member 12 and also through the direct contact of the steam in the mold cavity M. Next, the steam supply to the chambers 104, 136 is turned off and the water supply is connected at the same time that the drain valves are again opened. Thus a spray of cooling water is directed against the walls of both the core member 14 and cavity member 12 and the heat transferred thereto is carried away through the drain of such sprayed liquid.

The actual molding of the article is now complete, but before the mold cavity M is opened, the air supply is connected to the blow-filling gun 98 and the steam supply is, in turn, connected into the chambers 104, 136. When the air vent is immediately thereafter closed, a small portion of the air admitted into the blow-filling gun 98 passes between the plunger 190 and its encompassing bore 170 into the upper portion of the mold cavity M beneath the base of the cup C thus serving to create a film of air between the walls of the cavity member 12 and the outer surface of the cup C positioned therewithin. If necessary, a small slot (not shown) can be machined along the side of the plunger 190 to assure the air passage into the top of the cavity M. As a consequence, when the mold is subsequently opened, the slight pressure created by the air is sufficient to assure separation of the cup C from the confining walls of the cavity member 12.

In a somewhat similar manner, air is admitted through conduit 156 and valve 157 as the mold starts to open to urge the cylindrical member 152 upwardly against the tension of the springs 162. This initiates ejection of the cup C and permits the air to leak upwardly between the core member and the interior of the cup to gently ease the cup from its seat on the core member and finally eject the same.

Generally, it will be noted that through the entire operation as described, an overlapping of the functions or steps of the method is provided so that an absolute minimum of time for the entire molding cycle is assured. In particular, it will be noted that the mold is in its partially or fully-closed positions throughout over 90% of the entire cycle; wherefore, a maximum production rate is indicated, as has been previously mentioned.

Various modifications and/or alterations in the method, as described, and furthermore in the apparatus, can obviously be made without departing from the spirit of the present invention. As a consequence, the foregoing description of the method and apparatus as utilized in the formation of a plastic drinking cup is to be considered as purely exemplary and not in a limiting sense; and the scope of the invention is to be indicated by reference to the appended claims.

What is claimed is:

1. A molding method for molding a cup from expansible plastic beads which comprises the steps of intermittently establishing communication between a supply of beads and the interior of a cup-shaped mold cavity, inducing the flow of beads from the supply into the cavity while communication is established by conducting fluid through a venturi orifice to draw beads from the supply, entrain the same, and deliver the fluid and entrained beads into the mold cavity while such cavity is vented, creating a backflow of fluid from the mold cavity to the supply upon filling of the mold cavity with beads to stop the feeding of beads toward the mold cavity, then applying steam under pressure to the mold exterior and to the mold cavity to expand and unite the beads while the mold remains vented to purge all bead-supply fluid therefrom, then closing the mold while the steam is applied to complete uniting and expansion of the beads, thereafter cooling the mold by applying coolant to its exterior, and finally opening the mold and applying fluid pressure to the interior of the formed cup to eject the same from the opened mold.

2. In an apparatus for molding a relatively-thin-walled cup from expansible plastic beads, the combination of:
 (a) cavity-formed means for forming an inverted cup-shaped mold cavity having an upper end corresponding to the bottom of the cup and an annular lower end corresponding to the top of the cup;
 (b) said cavity-forming means including cavity and core members relatively movable between mold-open and mold-closed positions through an intermediate, venting position;
 (c) means for relatively moving said cavity and core members between said mold-open and mold-closed positions through said venting position;
 (d) said cavity and core members forming said mold cavity when in said mold-closed position;
 (e) said annular lower end of said mold cavity being open slightly, when said cavity and core members are in said venting position, to vent air from said mold cavity while retaining plastic beads within said mold cavity;
 (f) a supply chamber for plastic beads above said upper end of said mold cavity;
 (g) means forming a supply conduit extending downwardly from said supply chamber to a central portion of said upper end of said mold cavity;
 (h) an annular venturi encircling said supply conduit between said supply chamber and said upper end of said mold cavity;
 (i) said annular venturi having an annular air inlet and having an annular venturi outlet communicating with said supply conduit;
 (j) closure means axially insertable into said supply conduit and through said venturi with a sliding fit to close same, and axially withdrawable from said supply conduit and said venturi to open same;
 (k) means for supplying air under positive pressure to said annular inlet of said venturi with said closure means in its withdrawn position and with said cavity and core members in said venting position to vent air from said annular lower end of said mold cavity;
 (l) whereby the flow of air through said annular venturi outlet into said supply conduit draws plastic beads from said supply chamber and propels them under positive pressure into said mold cavity until said mold cavity is filled with plastic beads, whereupon air entering said supply conduit through said annular venturi outlet flows through said supply conduit into said supply chamber to clear said supply conduit of plastic beads to permit movement of said closure means to its inserted position to close said supply conduit; and
 (m) means for heating the plastic beads within said mold cavity, upon subsequent movement of said closure means to its inserted position and of said cavity and core members to said mold-closed position, to expand and unite the plastic beads in said mold cavity.

3. A molding apparatus as set forth in claim 2 including:
(a) an air outlet communicating with said annular inlet of said venturi; and
(b) means for opening and closing said air outlet.

References Cited by the Examiner

UNITED STATES PATENTS

| | | | |
|---|---|---|---|
| 2,951,260 | 9/60 | Harrison et al. | 18—48 XR |
| 3,028,625 | 4/62 | Dawson | 264—121 XR |
| 3,042,967 | 7/62 | Edberg | 264—53 |
| 3,099,045 | 7/63 | Honkanen. | |
| 3,118,176 | 1/64 | Freedman et al. | 264—51 XR |
| 3,125,780 | 3/64 | Harrison et al | 18—5 |
| 3,139,466 | 6/64 | Couchman | 264—51 |
| 3,159,875 | 12/64 | Stutz et al. | 264—53 XR |
| 3,162,705 | 12/64 | Smucker et al. | 264—53 |
| 3,167,811 | 2/65 | Kraus et al. | 264—53 XR |

OTHER REFERENCES

Koppers Publication, Dylite Bulletin C–9–273, Chapters 3d and 3e, November 15, 1959.

Lambert, Frank H.: Modern Plastics, "Foam molding goes automatic," February 1961, pp. 107–110, 112, 180, 181, 183 and 185, vol. 38, No. 6.

Zukor, L. J.: Plastics Technology, "Exploring fabrication techniques," April 1961, pp. 40, 41, and 43, vol. 7, No. 4.

ALEXANDER H. BRODMERKEL, *Primary Examiner.*

ROBERT F. WHITE, *Examiner.*